Figure 1:
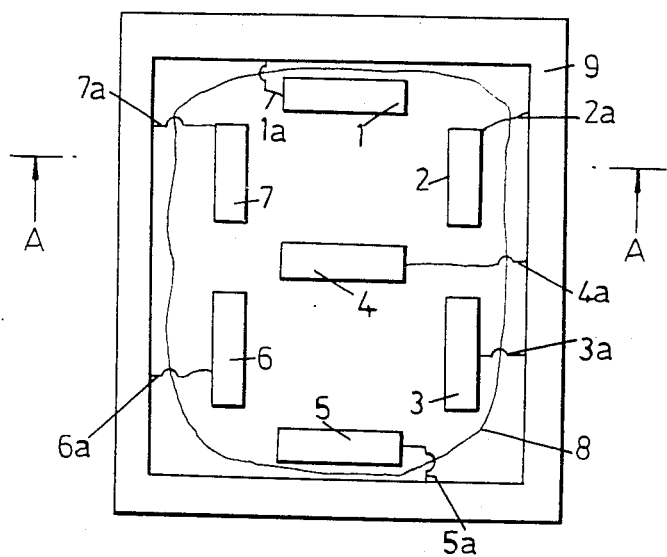

United States Patent

McDermott et al.

[11] 3,930,717
[45] Jan. 6, 1976

[54] VARIABLE LIGHT TRANSMISSION DEVICE CONTAINING FERROUS AMMONIUM SULFATE AS AN AUXILIARY REDOX SYSTEM

[75] Inventors: Michael John McDermott; John Graham Allen, both of Runcorn, England

[73] Assignee: Imperial Chemical Industries Limited, London, England

[22] Filed: Mar. 15, 1974

[21] Appl. No.: 451,690

[30] Foreign Application Priority Data
Mar. 16, 1973 United Kingdom............... 12904/73

[52] U.S. Cl............................... 350/160 R; 350/160
[51] Int. Cl.²........................................... G02F 1/36
[58] Field of Search ................................ 350/160 R

[56] References Cited
UNITED STATES PATENTS
3,712,709  1/1973  Kenworthy..................... 350/160 R
3,839,857  10/1974  Berets et al..................... 350/160 R Primary Examiner—Vincent P. McGraw
Attorney, Agent, or Firm—Cushman, Darby & Cushman

[57] ABSTRACT

A device for the control of light transmission or reflection comprises one or more working electrodes, preferably arranged to form a display and having radiation transmission or reflection properties, an active material comprising an N(p-cyanophenyl) substituted derivative of a compound, usually bicyclic, having two conjugated nitrogen-containing rings in contact with the working electrode surface, a counter electrode, also in contact with the active material and ferrous ammonium sulphate as an auxiliary redox system.

7 Claims, 2 Drawing Figures

U.S. Patent  Jan. 6, 1976  3,930,717

VARIABLE LIGHT TRANSMISSION DEVICE CONTAINING FERROUS AMMONIUM SULFATE AS AN AUXILIARY REDOX SYSTEM

This invention relates to display devices.

Our British Patent No. 1,314,049 (Equivalent to U.S. Pat. No. 3,712,709 and French Patent No. 7143859) describes the preparation of devices for control of light transmission or reflection which comprise a working electrode having radiation transmission or reflection properties; an active material comprising an N(p-cyanophenyl) substituted derivative of a compound, usually bicyclic having two conjugated nitrogen-containing rings, in contact with the working electrode surface; a counter electrode, also in contact with the active material, the counter electrode being so disposed with respect to the working electrode that the passage of radiation through the device is not materially affected by reactions occurring at the counter electrode. In the context of the application, "through the device" includes the case where the radiation is reflected partially or wholly by the working electrode surface.

We have found that for extended life an auxiliary redox system is preferably employed which is relatively stable to a accidental oxidation and we have found, therefore, that it is advantageous to include in the device, together with the active material, a second reversibly oxidisable species — ferrous ammonium sulphate — which provides a ferrous ferric ion combination in a particularly suitable form.

The present invention also provides a development of the invention described in the aforementioned patents in that there is provided a display device comprising a plurality of working electrodes disposed in such a manner that by deposition of the reduced N(p-cyanophenyl) compound upon a pre-selected pattern of said electrodes, a pattern for example a numeral or letter, will become visible either by increased light absorption by a transparent or translucent working electrode, or reduced reflectivity of a radiation reflecting working electrode.

Each of the working electrodes may be provided with a separate counter electrode, although this is not essential, since a single counter electrode, for example in the form of a wire or gauze around the periphery of the device comprising a plurality of the electrodes, may be quite satisfactory. Enhanced speed of response to passage of a current is given when the surface area of the counter electrode is greater than that of the working electrodes.

Figure 2:
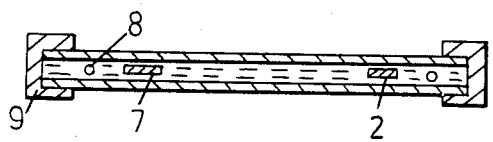

The device comprises essentially a cell, the top and bottom walls being of glass retained in frame 9. Disposed within the cell are a number of electrodes 1–7 each with its associated lead (1a-7a) which is connected to an appropriate control (not shown) located external to the cell. The counter electrode 8 in the form of a wire located in the periphery of the cell. This aspect of the invention is illustrated in the attached drawing in which a plurality of working electrodes (1 to 7), each with its own lead (1a to 7a) are disposed in a pattern capable of representing any numeral from 0 to 9 by selective deposition upon a prelselected group of the electrodes. The counter electrode (8) is represented by a wire, disposed around the perimeter of the device (9). FIG. 2 represents a section along the line A—A.

Alternative arrangements of the electrodes will be apparent to the skilled man. For example the electrodes could be deposited on the larger surfaces of an insulating sheet of material both of which, in the completed device, are in contact with the active material, conveniently plastics or glass, so that one surface forms the working electrode, the other the counter electrode. Such a system would be particularly convenient in a reflecting device, for example a clock face.

In a preferred embodiment the working and counter electrodes are inert metal sheets e.g. of gold or platinum, or sheets of glass or plastics material having a very thin metal layer deposited thereon, or conductive glass, and the active compounds etc are of materials as disclosed in the preceding application. Gold and platinum electrodes even when very thin, e.g. of the order of 100 A deposited on glass to give a transparent composite, have been found particularly useful.

The N(p-cyanophenyl) compound is reversibly electrolytically reduced in the device to a radical species which is coloured, usually green, while the parent compound is colourless or pale yellow.

The working electrode surface must obviously be conducting, but a high degree of conductivity is not essential. It will normally be two dimensional, that is, a flat surface or a surface curved in one or more planes. For a device in which light is transmitted through the electrode, it must be transparent or translucent, for which purpose a glass with a coating of a conducting oxide or a very thin metal film is required. For reflective devices, a metal surface may be used, or a transparent or translucent electrode may be backed by an reflecting surface, e.g. metal or other opaque reflecting material, e.g. white pigmented thermoplastic sheet.

Examples of active materials are simple salts or polymeric forms of di-N-substituted 4-4' bipyridyls at least one substituent being The preferred compound is N,N'-di(p-cyanophenyl) 4,4'-bipyridilium dichloride If a simple salt is used deposition of the insoluble coloured radical cation species occurs over the plane surface of the working electrode. As the simple radical cation is insoluble it does not diffuse away from the electrode surface, and is easily reoxidised to the colourless form by reversal of the applied potential.

Alternatively the active material may contain the (p-cyano-phenyl) group attached to a polymeric structure. For example a 4-(4'-pyridyl)N-p-cyanophenyl pyridinium salt reacts with polyvinyl chloracetate or copolymers thereof with polyvinyl alcohol to form an active material for use in the invention. If polyvinyl alcohol units are present these may be cross-linked, e.g. with glyoxal, to give a gelled active material.

The active material usually used in the presence of an aqueous medium, e.g. water or a water soluble polymer such as agar, gelatine, methyl cellulose, polyvinyl alcohol or polyvinyl-pyrrolidone. An inert electrolyte may be added to the medium to increase conductivity. Alkali metal salts, such as halides or fluoroborates are preferred.

Examples of anions which may be associated with the active materials are halides, especially chloride, $SO_4^=$, $HSO_4^-$, $RSO_4^-$ (where R is an alkyl group) $SiF_6^=$ or $BF_4^-$.

The concentration of the active material may be as described in our earlier application, that is, of the order of 0.001 M, but there may be some advantage in increasing it somewhat, say to about 0.01M so that our preferred concentration of the active material is between about 0.0005 and 0.02M and more preferably from 0.001 to 0.01M.

The concentration of ferrous ammonium sulphate employed will be limited by its solubility in the solvent under the operating conditions employed, but it will usually be from 0.1M to 0.6M, and preferably about 0.5M. The use of acid conditions, usually pH 1 to 3 preferably about pH 2 may be advantageous in stabilising the $Fe^{++} \rightleftharpoons Fe^{+++}$ reaction. Such conditions may be attained by the presence of an appropriate quantity of acid, preferably sulphuric acid.

In some circumstances we prefer to employ a small 'holding voltage' of the order of 0.2 to 0.4 v. Deposition is conveniently effected by increasing the voltage to 0.8 to 1.25 v for 100 milli-seconds. Colouring of the electrode usually commences 20 ms after application of the pulse.

It is most desirable to exclude molecular oxygen from within the device (e.g. dissolved in the liquid medium) since this tends to promote the formation of hydroxides of iron.

EXAMPLE 1

A device according to the invention was prepared as follows. Seven working electrodes (gold), arranged as shown in FIG. 1, were deposited upon a glass plate 1 inch square and ⅛ inch thick. The metal deposite forming the electrode was about 1000 A thick. The plate was located within a cell and around the periphery of the plate was positioned a counter electrode in the form of a spiral wire. Connections to the electrodes were made as appropriate so that current could be passed to all or some of them as required.

The active component was N,N'-di(p-cyanophenyl) 4,4'-bipyridilium dichloride in aqueous solution at a concentration of 0.01 M. The solution also contained ferrous ammonium sulphate in 0.5M concentration, and was acidified using dilute sulphuric acid to pH 2.

A potential of 0.8 v was employed to operate the device, which was cycled at 22°C (by reversing the polarity of the working and counter electrodes) $1 \times 10^7$ times without apparent deterioration.

EXAMPLE 2

Three devices were prepared as in Example 1. A potential of 0.8 v was employed to operate the devices which were cycled at −5°C, +50°C, +60°C respectively $1 \times 10^7$ times without apparent deterioration.

EXAMPLE 3

A device similar to that of Example 1 was prepared using ferrous sulphate instead of ferrous ammonium sulphate and deterioration of the system led to failure within a few hundred cycles.

What we claim is:

1. A device for the control of light transmission or reflection which comprises a working electrode having radiation transmission or reflection properties, a counter electrode, and a solution comprising (a) an active material which is an N(p-cyanophenyl)-substituted derivative of a compound, usually bicyclic, having two conjugated nitrogen-containing rings and (b) ferrous ammonium sulphate, said solution being in contact with both working and counter electrodes.

2. A device according to claim 1 in which the active material is a N,N'di(p-cyanophenyl) 4,4'-bipyridyl salt.

3. A device according to claim 1 which comprises a plurality of working electrodes disposed to form a display.

4. A device according to claim 1 in which the concentration of the active material is within the range 0.0005 to 0.02M.

5. A device according to claim 4 in which the concentration of the active material is within the range 0.001 to 0.01M.

6. A device according to claim 1 in which the concentration of the ferrous ammonium sulphate is 0.1M to 0.5M.

7. A device according to claim 1 in which the pH of the solution is between 1 and 3.

* * * * *